(12) United States Patent
Chiao et al.

(10) Patent No.: US 8,776,144 B2
(45) Date of Patent: Jul. 8, 2014

(54) MOBILE TV SYSTEM AND METHOD FOR SYNCHRONIZING THE RENDERING OF STREAMING SERVICES THEREOF

(75) Inventors: Hsin-Ta Chiao, Nantou County (TW); Jhih-Wei Jiang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 877 days.

(21) Appl. No.: 12/542,676

(22) Filed: Aug. 17, 2009

(65) Prior Publication Data

US 2010/0100917 A1   Apr. 22, 2010

Related U.S. Application Data

(60) Provisional application No. 61/106,145, filed on Oct. 16, 2008.

(30) Foreign Application Priority Data

Jun. 5, 2009   (TW) .............................. 98118801 A

(51) Int. Cl.
*H04N 7/16* (2011.01)
*H04N 7/173* (2011.01)
*H04J 3/06* (2006.01)
*G06F 15/16* (2006.01)

(52) U.S. Cl.
USPC .............. 725/62; 725/118; 709/248; 370/503

(58) Field of Classification Search
USPC ............. 725/62, 110; 370/231, 350, 503–515
See application file for complete search history.

(56) References Cited

U.S. PATENT DOCUMENTS

| 7,936,794 B2* | 5/2011 | Gibbons et al. ............... 370/516 |
| 2003/0161302 A1* | 8/2003 | Zimmermann et al. ...... 370/363 |
| 2004/0228367 A1* | 11/2004 | Mosig ........................... 370/503 |
| 2006/0088023 A1 | 4/2006 | Muller |
| 2007/0110074 A1* | 5/2007 | Bradley et al. ........... 370/395.51 |
| 2008/0040761 A1* | 2/2008 | Xu et al. ....................... 725/105 |

(Continued)

FOREIGN PATENT DOCUMENTS

| CN | 1489356 | 4/2004 |
| CN | 101202600 | 6/2008 |
| EP | 1398931 | 3/2004 |
| WO | 2008051123 | 5/2008 |

OTHER PUBLICATIONS

"Search Report of European Counterpart Application", issued on Feb. 26, 2010, p. 1-p. 11.

(Continued)

*Primary Examiner* — Randy Flynn
(74) *Attorney, Agent, or Firm* — Jianq Chyun IP Office

(57) ABSTRACT

An Internet Protocol (IP)-based mobile TV system and a method for synchronizing the rendering of a streaming service are provided. In the IP-based mobile TV system, a plurality of mobile terminals receives a streaming service from network equipment, along with both a sequence of Network Time Protocol (NTP) time stamps corresponding to the streaming service and a synchronization clock. Each mobile terminal recovers an NTP reference clock for rendering the received streaming service according to both the synchronization clock and a synchronization time difference value, and then renders the received streaming service according to both the recovered NTP reference clock and the received NTP time stamps. Accordingly, the plurality of mobile terminals in the IP-based mobile TV system is able to render the received streaming service synchronously.

27 Claims, 14 Drawing Sheets

(56) References Cited

U.S. PATENT DOCUMENTS

| | | | |
|---|---|---|---|
| 2008/0141322 A1* | 6/2008 | Jang et al. | 725/114 |
| 2008/0259966 A1* | 10/2008 | Baird et al. | 370/503 |
| 2009/0074079 A1* | 3/2009 | Lee et al. | 375/240.25 |
| 2009/0110132 A1* | 4/2009 | Kondrad et al. | 375/354 |
| 2009/0204843 A1* | 8/2009 | Celinski et al. | 709/217 |
| 2010/0020829 A1* | 1/2010 | Ruffini | 370/509 |
| 2010/0189256 A1* | 7/2010 | Doehla et al. | 709/231 |

OTHER PUBLICATIONS

Boronat et al., "Sincronizacion de grupo multimedia basada en protocolos estandar", IEEE Latin Transactions, vol. 5, No. 6, Oct. 6, 2007, p. 457-464.

Ishibashi et al., "A group Synchronization mechanism for Live Media in Multicast c~Communications"., Global Telecommunications Conference, 1997. GLOBECOM '97., IEEE.

Digital Video Broadcasting, The road towards IP (and away from TS) 3rd CMT Workshop Jul. 8, Bordeaux (France).

"1st Office Action of Europe Counterpart Application", issued on Nov. 25, 2010, p. 1-p. 8.

Jongkwon Kim et al., "Adaptive Inter-media Synchronization for Multiple Session-based Uncompressed HD Media Transport", appears in Proc. SPIE 6777, 67770B (2007), issued on Sep. 10, 2007, 12 pages.

Toshiro Nunome et al., "Inter-Destination Synchronization Schemes for Continuous Media Multicasting: An Application-Leval QoS Comparison in Hierarchical Networks", appears in IEICE Trans Commun., vol. E85-B, No. 1, issued on Jan. 2002, p. 1-p. 12.

"Office Action of Taiwan counterpart application" issued on Sep. 20, 2012, p. 1-p. 16.

* cited by examiner

```
v=0
o=ghost 2890844526 2890842807 IN IP4 192.168.10.10
s=IPDC SDP Example
i=Example of IPDC streaming SDP file
e=ghost@mailserver.example.com
c=IN IP6 FF1E:03AD::7F2E:172A:1E24
t=3034423619 3042462419
b=AS:77
a=source-filter: incl IN IP6 * 2001:210:1:2:240:96FF:FE25:8EC9
a=min-buffer-time:500
a=RecommendedDefaultDT:15552000.5
m=video 4002 RTP/AVP 96
b=TIAS:62000
b=RR:0
b=RS:600
a=maxprate:17
a=avg-br:48000
a=rtpmap:96 H264/90000
a=fmtp:96 profile-level-id=42A01E; packetization-mode=1;
sprop-parameter-sets=Z0IACpZTBYml,aMljiA==
m=audio 4004 RTP/AVP 98
b=TIAS:15120
b=RR:0
b=RS:600
a=maxprate:10
a=avg-br:14000
a=rtpmap:98 AMR/8000
a=fmtp:98 octet-align=1
```

FIG. 3

```
v=0
o=ghost 2890844526 2890842807 IN IP4 192.168.10.10
s=IPDC SDP Example
i=Example of IPDC streaming SDP file
e=ghost@mailserver.example.com
c=IN IP6 FF1E:03AD::7F2E:172A:1E24
t=3034423619 3042462419
b=AS:77
a=source-filter: incl IN IP6 * 2001:210:1:2:240:96FF:FE25:8EC9
a=min-buffer-time:500
a=DirectDefaultDT:15552000.5
m=video 4002 RTP/AVP 96
b=TIAS:62000
b=RR:0
b=RS:600
a=maxprate:17
a=avg-br:48000
a=rtpmap:96 H264/90000
a=fmtp:96 profile-level-id=42A01E; packetization-mode=1;
sprop-parameter-sets=Z0IACpZTBYml,aMljiA==
m=audio 4004 RTP/AVP 98
b=TIAS:15120
b=RR:0
b=RS:600
a=maxprate:10
a=avg-br:14000
a=rtpmap:98 AMR/8000
a=fmtp:98 octet-align=1
```

FIG. 13

MOBILE TV SYSTEM AND METHOD FOR SYNCHRONIZING THE RENDERING OF STREAMING SERVICES THEREOF

CROSS-REFERENCE TO RELATED APPLICATION

This application claims the priority benefits of U.S. provisional Application Ser. No. 61/106,145, filed on Oct. 16, 2008 and Taiwan Application Serial No. 98118801, filed on Jun. 5, 2009. The entirety of each of the above-mentioned patent applications is hereby incorporated by reference herein and made a part of this specification.

BACKGROUND OF THE INVENTION

1. Field of the Invention

The disclosure generally relates to a mobile TV system, and a method for synchronizing the rendering of a streaming service in a plurality of user terminals.

2. Description of Related Art

Currently, as for streaming services provided by an IP-Based mobile TV system, time-based A/V streams, interactive services, or notification service are transmitted to a user terminal device of a mobile TV through a Real-time Transport Protocol (RTP) in a broadcast or multicast manner.

In particular applications, the same streaming service may need to be displayed synchronously on mobile TV user terminal devices. For example, when the streaming service includes an interactive service (such as real-time callback and real-time question answering), in order to ensure fairness of the interactive service, the time of rendering the streaming service on different mobile TV user terminals has to be synchronized. Alternatively, when users of the mobile TV user terminals need to watch the same streaming service and talk with each other about the content of the streaming service through the respective user terminal device at the same time, if the rendering of the streaming service is synchronized on the user terminals, it will facilitate the discussion. Moreover, a plurality of mobile TV user terminal devices may be placed in one location for demonstration or for sale at the same time. At this time, if the mobile TV user terminal devices are able to receive and render the same streaming service synchronously, the customers are able to compare the differences of the display characteristics on the mobile TV user terminal devices conveniently.

For a conventional analog and digital TV, it is not a problem to display the same program synchronously. However, for an IP-based mobile TV system, for example, Digital Video Broadcasting-Handheld (DVB-H), 3rd Generation Partnership Project Multimedia Broadcast Multicast Service (3GPP MBMS), Worldwide Interoperability for Microwave Access Multicast Broadcast Service (WiMAX MBS), since the RTP is originally designed for a unicast streaming service, a problem of synchronization of rendering the same streaming service on different mobile user terminal devices in broadcast or multicast transmission is not taken into consideration.

FIG. 1 is an exemplary schematic view of transmitting a multimedia stream through RTP according to the related art. The multimedia stream includes an audio stream, a video stream, and an event stream.

Referring to FIG. 1, time stamps TSa(i), TSv(i), and TSe(i) are RTP time stamps used on the audio stream, the video stream, and the event stream transmitted through RTP respectively. The clock rates of the RTP time stamps are essentially the sample rates of the audio stream, the video stream, and the event stream, respectively. In addition, the synchronization information required for rendering the audio stream, the video stream, and the event stream at the same time is carried by Real-time Transport Control Protocol (RTCP) packets. Specifically, each media stream (that is, the audio stream, the video stream, and the event stream) has a dedicated RTCP channel. The RTCP channel is responsible for transmitting an RTCP Sender Report (SR) packet required by the corresponding media stream periodically. One RTCP SR packet includes a Network Time Protocol (NTP) time stamp and a corresponding RTP time stamp of the media stream. For example, the NTP time stamp corresponding to the RTP time stamp Vt(1) of the video stream is NTPv(1), and the NTP time stamp corresponding to the RTP time stamp At(1) of the audio stream is NTPa(1). As the NTP time stamps included in the RTCP SR packets of the media streams come from the same wall clock, a plurality of media streams may be rendered synchronously on one user terminal device.

However, in an IP-Based mobile TV system, the NTP time stamps of the RTCP SR packets do not record the exact time for an A/V multimedia stream to be actually rendered on a mobile TV terminal. In fact, the wall clock and the time recorded by the NTP time stamps are not strictly defined, and usually an NTP time stamp contains the instance of time when a plurality of media streams is synchronously mixed into a multimedia stream. Moreover, in IP-Based mobile TV systems, no standard method is specified to determine the corresponding relationship between the clock recorded by the NTP time stamps in the RTCP SR packets and the clock on that the multimedia stream is actually rendered. Therefore, due to performance differences in mobile user terminal devices, different initial delays for rendering will occur when the same streaming service is received for rendering. This causes the phenomenon of asynchronous rendering of the streaming service. Taking the DVB-H as an example, the Multiple-Protocol Encapsulation-Forward Error Correction (MPE-FEC) decoding delay in the Media Access Control (MAC) layer and the initial buffering delay of an AV decoder are both the causes of the differences in initial delays for streaming rendering on different mobile TV user terminals. Therefore, it is necessary to develop a system that is capable of synchronizing the rendering of a streaming service on a plurality of mobile TV user terminals in an IP-Based mobile TV system.

SUMMARY OF THE INVENTION

The disclosure is directed to a mobile TV system, in which all mobile terminals may render a Real-time Transport Protocol (RTP) streaming service synchronously.

The disclosure is further directed to a method of synchronizing a streaming service in a mobile TV system, which enables all mobile terminals to render a RTP streaming service synchronously.

In an exemplary embodiment, the disclosure provides a mobile TV system. The mobile TV system includes an Internet Protocol (IP)-based mobile TV server set, network equipment, and a plurality of mobile terminals. The IP-based mobile TV server set transmits a streaming service and a sequence of Network Time Protocol (NTP) time stamps corresponding to the streaming service through the Real-time Transport Protocol (RTP). The network equipment provides at least one network to transport the streaming service and the sequence of the NTP time stamps. Each mobile terminal receives the streaming service, the sequence of the NTP time stamps, and a synchronization clock from the network equipment. Each mobile terminal recovers an NTP reference clock for rendering the received streaming service according to the synchronization clock and a synchronization time difference value, and renders the received streaming service according to the recovered NTP reference clock and the received NTP time stamps.

In an exemplary embodiment, the disclosure provides a method for synchronizing the rendering of a streaming service in a mobile TV system. The method includes transmitting a streaming service and a sequence of NTP time stamps corresponding to the streaming service over RTP through network equipment by using an IP-Based mobile TV server set. The method also includes receiving the streaming service, the sequence of the NTP time stamps, and a synchronization clock from the network equipment by using a plurality of mobile terminals. The method further includes recovering an NTP reference clock for rendering the received streaming service according to the synchronization clock and a synchronization time difference value in each mobile terminal, and rendering the received streaming service according to the recovered NTP reference clock and the received NTP time stamp in each mobile terminal.

In view of the above descriptions, the exemplary embodiments of the disclosure may enable all mobile terminals in a mobile TV system to render the received RTP streaming service synchronously.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 3 is an example of transmitting a proposed time difference value through SDP description according to the first exemplary embodiment of the disclosure.

FIG. 13 is an example of transmitting available time difference values through SDP description according to the fifth exemplary embodiment of the disclosure.

DESCRIPTION OF THE EXEMPLARY EMBODIMENTS

Figure 1:
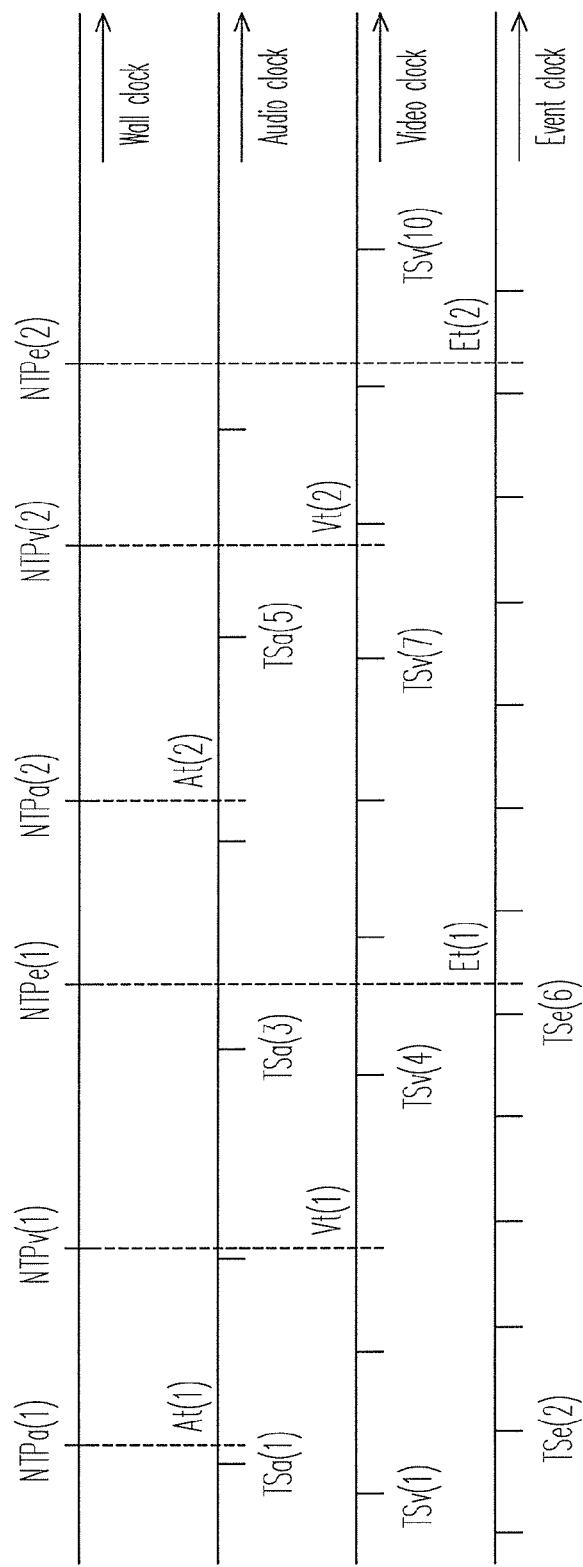
FIG. 1 is an exemplary schematic view of transmitting a multimedia stream through RTP according to the related art.

Reference will now be made in detail to the present exemplary embodiments of the invention, examples of which are illustrated in the accompanying drawings. Wherever possible, the same reference numbers are used in the drawings and the description to refer to the same or like parts.

The mobile TV system proposed in the exemplary embodiments transmits a streaming service and a sequence of Network Time Protocol (NTP) time stamps corresponding to the streaming service to a plurality of mobile terminals via network equipment through Real-time Transport Protocol (RTP) by an Internet Protocol (IP)-based mobile TV server set. The mobile terminal recovers an NTP reference clock for rendering the received streaming service according to a synchronization time difference value and a synchronization clock received from the network equipment, and renders the received streaming service according to the recovered NTP reference clock and the received NTP time stamps.

Specifically, when an RTP streaming service is transmitted by the IP-based mobile TV server set in a multicast or broadcast manner, the time recorded in the NTP time stamp in a Real-time Transport Control Protocol (RTCP) Sender Report (SR) packet transmitted along with the RTP streaming service follows a wall clock $C_{NTP}$. In addition, on the IP-based mobile TV system, each mobile terminal receives and maintains a synchronization clock $C_{sync}$. That is to say, the synchronization clock $C_{sync}$ achieves the synchronization of the clock on a plurality of mobile terminals by a technical manner that is out-of-band from the RTP streaming service. Subsequently, the mobile terminal receiving the streaming service uses the synchronization clock $C_{sync}$ as a reference clock for rendering the received RTP streaming service.

Specifically, on each mobile terminal, the time value $T_{NTP}$ originally recorded in the NTP time stamps in the RTCP SR packet is converted into a time based on the synchronization clock $C_{sync}$ (that is, the time value $T_{NTP}$+the time difference value dT). Here, if time differences dT between the synchronization clock $C_{sync}$ on each mobile terminal and the wall clock $C_{NTP}$ (that is, $dT = C_{sync} - C_{NTP}$) are adjusted to be the same, the rendering time for all the mobile terminals to render the streaming service may be synchronized.

In addition, another effective manner is providing an NTP reference clock $C_{NTP-R}$ of an RTP streaming service on each mobile terminal. The NTP reference clock $C_{NTP-R}$ is recovered through the synchronization clock $C_{sync}$ on each mobile terminal. That is to say, each mobile terminal generates the NTP reference clock $C_{NTP-R}$ according to the synchronization clock $C_{sync}$ i.e., NTP reference clock $C_{NTP-R}$ = synchronization clock $C_{sync}$ –time difference value dT), and renders the streaming service according to both the time $T_{NTP}$ originally recorded in the NTP time stamp of the RTCP SR packet and the generated NTP reference clock $C_{NTP-R}$. Based on this, if the time difference values dT on respective mobile terminals are able to be consistent, the NTP reference clocks $C_{NTP-R}$ on respective mobile terminals can also be synchronized. Therefore, the time of respective mobile terminals for rendering the streaming service may be synchronized.

However, it should be noted that the selection of the time difference value dT cannot cause the rendering time of any mobile terminal (that is, time value $T_{NTP}$+time difference value dT) to exceed the performance limitation of the mobile terminal. That is to say, if the time difference value dT is set too small, it may result in that the decoding of A/V data is still unable to be finished on a low-performance mobile terminal when the A/V data of the streaming service reaches the specified rendering time. Consequently, the decoded A/V data are unable to be rendered on the mobile terminal in time. Therefore, the real rendering time of the streaming service will be later than the specified rendering time, thus causing the asynchronism of the rendering of the streaming service.

The disclosure is described in further detail in the following through several exemplary embodiments with reference to the drawings. It should be noted that in the following exemplary embodiments, the illustration is given by taking a method for determining a synchronous NTP reference clock $C_{NTP-R}$ as an example. However, the exemplary embodiments may also be applied in the examples where the time value $T_{NTP}$ originally recorded in the NTP time stamp is converted into the time based on the synchronization clock $C_{sync}$ in each mobile terminal.

The First Exemplary Embodiment

Figure 2:
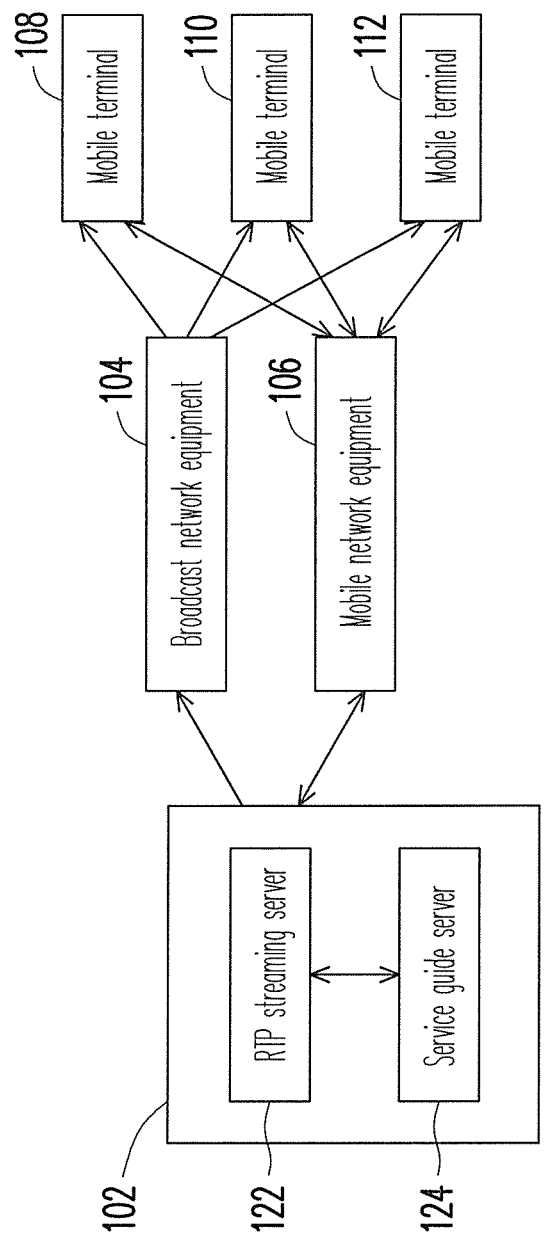
FIG. 2 is a schematic block diagram of a mobile TV system according to the first exemplary embodiment of the disclosure.

FIG. 2 is a schematic block diagram of a mobile TV system according to a first exemplary embodiment of the disclosure.

Referring to FIG. 2, a mobile TV system 100 includes an Internet Protocol (IP)-Based mobile TV server set 102, broadcast network equipment 104, mobile network equipment 106, a mobile terminal 108, a mobile terminal 110, and a mobile terminal 112.

The IP-based mobile TV server set 102 is a set of IP-based headend servers required in the operation of the mobile TV system 100. In this exemplary embodiment, the IP-based mobile TV server set 102 is able to provide a streaming service in a broadcast or multicast manner. Here, the streaming service is a scheduled service, or an on-demand service requested by a mobile terminal (for example, mobile terminal 108). Specifically, the IP-based mobile TV server set 102 transmits an RTP streaming service through Real-time Transport Protocol (RTP), and transmits a sequence of network time protocol (NTP) time stamps corresponding to the streaming service through Real-time Transport Control Protocol (RTCP) defined in the RTP standard (RFC 3550).

The IP-based mobile TV server set 102 includes an RTP streaming server 122 and a service guide server 124.

The RTP streaming server 122 is configured to transmit the RTP streaming service to the mobile terminal 108, the mobile terminal 110, and the mobile terminal 112 through a unidirectional IP channel provided by the broadcast network equipment 104. In addition, the RTP streaming server 122 provides the service guide server 124 with information related to the transmitted RTP streaming service. For example, the related information includes information contained in session description protocol (SDP) description for the RTP streaming service (as shown in FIG. 3). In this exemplary embodiment, the RTP streaming server 122 is an RTP streaming server complying with the Digital Video Broadcasting-IP Datacast (DVB-IPDC) standard. However, it should be understood that the disclosure is not limited thereto. In another exemplary embodiment of the disclosure, the RTP streaming server 122 may also be an RTP streaming server complying with the OMA BCAST standard or other mobile TV standards.

The service guide server 124 is configured to transmit service guide data to the mobile terminal 108, the mobile terminal 110, and the mobile terminal 112 through the broadcast network equipment 104, the mobile network equipment 106, or a combination of the broadcast network equipment 104 and the mobile network equipment 106. In this exemplary embodiment, the service guide server 124 transmits the proposed time difference value $dT_{def-r}$ for a streaming service to the mobile terminal 108, the mobile terminal 110, and the mobile terminal 112 through the SDP description for the streaming service (as shown in FIG. 3).

In this exemplary embodiment, the service guide server 124 is an electrical service guide (ESG) server complying with the DVB-IPDC standard. However, it should be noted that the disclosure is not limited thereto. In another exemplary embodiment of the disclosure, the service guide server 124 may also be a service guide server complying with the OMA BCAST standard or other mobile TV standards.

The broadcast network equipment 104 includes the headend equipments and the wireless signal transmitters required to form a unidirectional broadcast network. In the mobile TV system 100, the broadcast network equipment 104 is responsible for transmitting the unidirectional IP multicast packet stream from the IP-based mobile TV server set 102 to the mobile terminal 108, the mobile terminal 110, and the mobile terminal 112. The IP multicast packet stream carries a series of packets of the RTP streaming service. In this exemplary embodiment, the broadcast network equipment 104 is configured to transport the stream service and a sequence of the NTP time stamps $T_{NTP}$ corresponding to streaming service.

The mobile network equipment 106 is a network element configured to receive wireless signals and perform packet exchange. In the IP-based mobile TV system 100, the mobile network equipment 106 is configured to provide a bidirectional return channel between the mobile terminals and the IP-based mobile TV server set 102.

The mobile terminal 108, the mobile terminal 110, and the mobile terminal 112 are user terminal devices with which users receive and watch a mobile TV streaming service. In this exemplary embodiment, the mobile terminal 108, the mobile terminal 110, and the mobile terminal 112 receive a streaming service and a corresponding sequence of NTP time stamps $T_{NTP}$ from the broadcast network equipment 104. Especially, the mobile terminal 108, the mobile terminal 110, and the mobile terminal 112 receive a synchronization clock $C_{sync}$ from the broadcast network equipment 104. Specifically, the mobile terminal 108, the mobile terminal 110, and the mobile terminal 112 obtain and maintain the synchronization clock $C_{sync}$ through a clock synchronization protocol provided by the broadcast/multicast transport technology below the IP layer of a mobile TV system. It should be noted that in another exemplary embodiment of the disclosure, the mobile terminal 108, the mobile terminal 110, and the mobile terminal 112 may also obtain and maintain the synchronization clock $C_{sync}$ through a clock synchronization protocol provided by the mobile network equipment 106. In addition, in another exemplary embodiment that is a variation of the abovementioned exemplary embodiment, the clock synchronization protocol is a protocol over the IP layer, for example, the Network Time Protocol (NTP) (RFC 1305) or the Simple Network Time Protocol (SNTP) (RFC 4330), which is carried by the mobile network equipment 106.

In this exemplary embodiment, each mobile terminal (that is, the mobile terminal 108, the mobile terminal 110, and the mobile terminal 112) receives a proposed time difference value $dT_{def-r}$ coming from the IP-based mobile TV server set 102 from the broadcast network equipment 104 or the mobile network equipment 106, and generates an expected time difference value $dT_{Exp\_i}$ with reference to the proposed time difference value $dT_{def-r}$, wherein i denotes an identifier of the mobile terminal. Especially, each mobile terminal is able to render the streaming service successfully at the rendering time recovered according to the expected time difference value $dT_{Exp\ i}$ generated by itself. In other words, this means that the temporary NTP reference clock (temporary $C_{NTP-R} = C_{sync} - dT_{Exp\ i}$) is a workable NTP reference clock for the implementation performance of mobile terminal i to render the received RTP streaming service in the designated time correctly. In addition, all the mobile terminals communicate with each other and coordinate a synchronization time difference value $dT_{sync}$ through a distributed algorithm according to all the expected time difference values $dT_{Exp\ i}$, as the following Formula (1):

$$dT_{sync} \geq MAX\ \{dT_{Exp\ i}\} \tag{1}$$

Moreover, each mobile terminal generates an NTP reference clock $C_{NTP-R}$ according to the synchronization clock $C_{sync}$ and the synchronization time difference value $dT_{sync}$ (that is, $C_{NTP-R} = C_{sync} - dT_{sync}$), and renders the received streaming service according to the generated NTP reference clock $C_{NTP-R}$ and the corresponding NTP time stamps $T_{NTP}$ of the streaming service.

Figure 4:
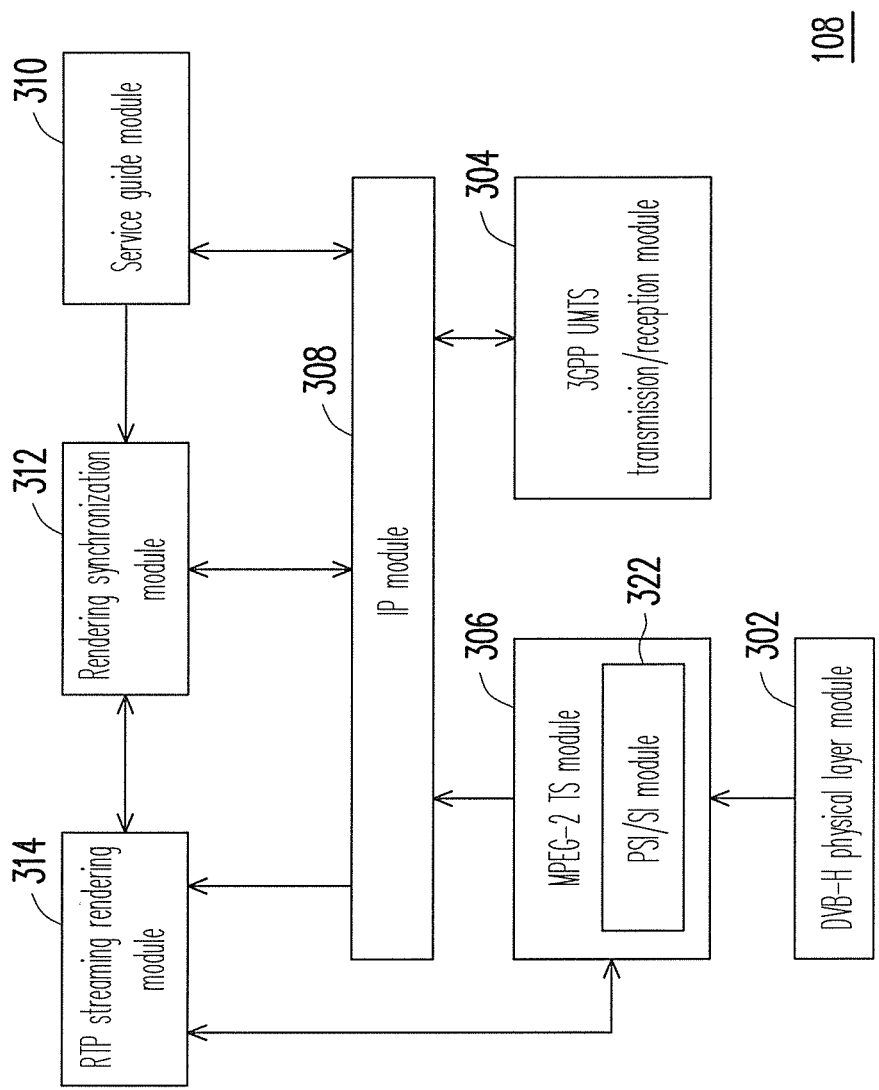
FIG. 4 is a schematic block diagram of a mobile terminal in FIG. 2.

FIG. 4 is a schematic block diagram of a mobile terminal in FIG. 2. Structures and functions of the mobile terminal 108, the mobile terminal 110, and the mobile terminal 112 are all the same, and the mobile terminal 108 is taken as an example for illustration here.

Referring to FIG. 4, the mobile terminal 108 includes a DVB-H physical layer module 302, a 3rd generation partnership project (3GPP) universal mobile telecommunications system (UMTS) transmission/reception module 304, an moving picture experts group (MPEG)-2 transport stream (TS) module 306, an IP module 308, a service guide module 310, a rendering synchronization module 312, and an RTP streaming rendering module 314.

The DVB-H physical layer module 302 is configured to receive an IP packet from the IP-based mobile TV server set 102 through the broadcast network equipment 104. Specifically, the DVB-H physical layer module 302 performs functions of the DVB-H physical layer, so as to transmit the MPEG-2 TS packet received from the DVB-H broadcast network (that is, the broadcast network equipment 104) to the MPEG-2 TS module 306.

The 3GPP UMTS transmission/reception module 304 is configured to transmit and receive the IP packet with the IP-based mobile TV server set 102 or other mobile terminals (for example, the mobile terminal 110 or the mobile terminal 112) through the mobile network equipment 106.

The MPEG-2 TS module 306 is configured to assemble the MPEG-2 TS packets of a Multi-Protocol Encapsulation (MPE) section that carries an IP packet into a complete IP packet according to criteria defined in the DVB-H standard, and forward it to the IP module 308. In addition, the MPEG-2 TS module 306 can also recover an IP packet including transport error through the information carried in the MPE-Forward Error Correction (FEC) section.

In this exemplary embodiment, the MPEG-2 TS module 306 includes a Program-Specific Information (PSI)/Service Information (SI) module 322, which is configured to receive and maintain the PSI/SI tables carried in the MPEG-2 transport stream, which contain the information related to the broadcast network equipment 104.

Specifically, the PSI/SI table includes a Time and Date Table (TDT) and a Time and Offset Table (TOT). The TDT provides a standard clock on the broadcast network equipment 104, and the time zone of the standard clock is Universal Time, Coordinated (UTC), that is, the Greenwich Mean Time (GMT). The TOT provides a local time standard clock on the broadcast network equipment 104. Since the time zone of the local time is not necessarily the UTC, a time offset between the time zone of the local time and the UTC is recorded in the TOT. Especially, the DVB-H physical layer modules in the mobile terminal 108, the mobile terminal 110, and the mobile terminal 112 receive the same RTP streaming service. The RTP streaming service can be delivered either in only one MPEG-2 transport stream, or in a plurality of MPEG-2 transport streams, In addition, the RTP service is transmitted in a closely synchronized manner for the case of delivery in the abovementioned plurality of MPEG-2 transport streams. At this time, the mobile terminal 108, the mobile terminal 110, and the mobile terminal 112 use the clock recovered by receiving the TDT or the TOT as the synchronization clock $C_{sync}$.

In this exemplary embodiment, the TDT or the TOT is transmitted by a DVB-H IP encapsulator in the broadcast network equipment 104. In this exemplary embodiment, the DVB-H IP encapsulator transmits the TDT or TOT in the following manner for a certain RTP streaming service. For example, the DVB-H IP encapsulator transmits the TDT or TOT in every transport burst of an RTP streaming service. In addition, in another exemplary embodiment of the disclosure, the DVB-H IP encapsulator may also transmit the TDT or TOT in one of every N transport burst of an RTP streaming service, in which N is a natural number. Moreover, in another exemplary embodiment of the disclosure, the DVB-H IP encapsulator may also transmit the TDT or TOT in a transport burst only for every M seconds (for example, 10 seconds) in a MPEG-2 transport stream.

The IP module 308 is configured to process the routing between different networks. In this exemplary embodiment, the IP module 308 is configured to receive and process the IP packet from the MPEG-2 TS module 306, and transmit the received IP packet to the service guide module 310 or the RTP streaming rendering module 314.

The service guide module 310 is configured to receive and maintain the service guide data from the IP-based mobile TV server set 102 and transmitted through the broadcast network equipment 104 or the mobile network equipment 106. Especially, the service guide module 310 receives and processes the proposed time difference value $dT_{def-r}$ from the IP-based mobile TV server set 102. In this exemplary embodiment, the service guide server 124 complies with the DVB-IPDC standard, and therefore the service guide module 310 has to comply with the DVB-IPDC standard.

The rendering synchronization module 312 is configured to determine an expected time difference (for example, an expected time difference value $dT_{Exp\ 1}$ of the mobile terminal 108). Specifically, during the procedure where the expected time difference $dT_{Exp\ 1}$ is determined, the rendering synchronization module 312 first selects one test value of the expected time difference value $dT_{Exp\ 1}$. Subsequently, the value is delivered to the RTP streaming rendering module 314 to determine whether the test value of the expected time difference value $dT_{Exp\ 1}$ exceeds the performance limitation of the mobile terminal 108 or not (that is, whether a phenomenon that the real rendering time is later than the specified rendering time is resulted or not). If the test value of the expected time difference value $dT_{Exp\ 1}$ is still within the performance limitation of the mobile terminal 108, the rendering synchronization module 312 takes the test value of the expected time difference value $dT_{Exp\ 1}$ as the final value of the $dT_{Exp\ 1}$. Otherwise, the rendering synchronization module 312 selects another value of the expected time difference value $dT_{Exp\ 1}$ again for test. In addition, when selecting a test value of the expected time difference value $dT_{Exp\_1}$, the rendering synchronization module 312 refers to the proposed time difference value $dT_{def-r}$ received from the service guide module 310. Especially, in this exemplary embodiment, through the communications among the 3GPP UMTS transmission/reception modules of all the mobile terminals, the rendering synchronization modules of all the mobile terminals determine a synchronization time difference value $dT_{sync}$, which meets the Formula (1) through a distributed algorithm (for example, a distributed election protocol) that takes the determined expected time difference values as input. The distributed algorithm is a technology well known to those skilled in the art, and the description of which in detail is omitted here.

The RTP streaming rendering module 314 is configured to receive the synchronization clock $C_{sync}$ from the PSI/SI module 322, receive the synchronization time difference value $dT_{sync}$ from the rendering synchronization module 312, and render the received streaming service. Specifically, the RTP streaming rendering module 314 recovers the NTP reference clock $C_{NTP-R}$ according to the received synchronization clock $C_{sync}$ and the synchronization time difference value $dT_{sync}$, and renders the received streaming service according to the recovered NTP reference clock $C_{NTP-R}$ and the corresponding NTP time stamps $T_{NTP}$.

In view of the above, in the architecture of the mobile TV system 100, the mobile terminal 108, the mobile terminal 110, and the mobile terminal 112 render the received streaming service with the synchronized NTP reference clock $C_{NTP-R}$. Therefore, the rendering time of the streaming service in the mobile terminal 108, the mobile terminal 110, and the mobile terminal 112 may be the same.

Figure 5:
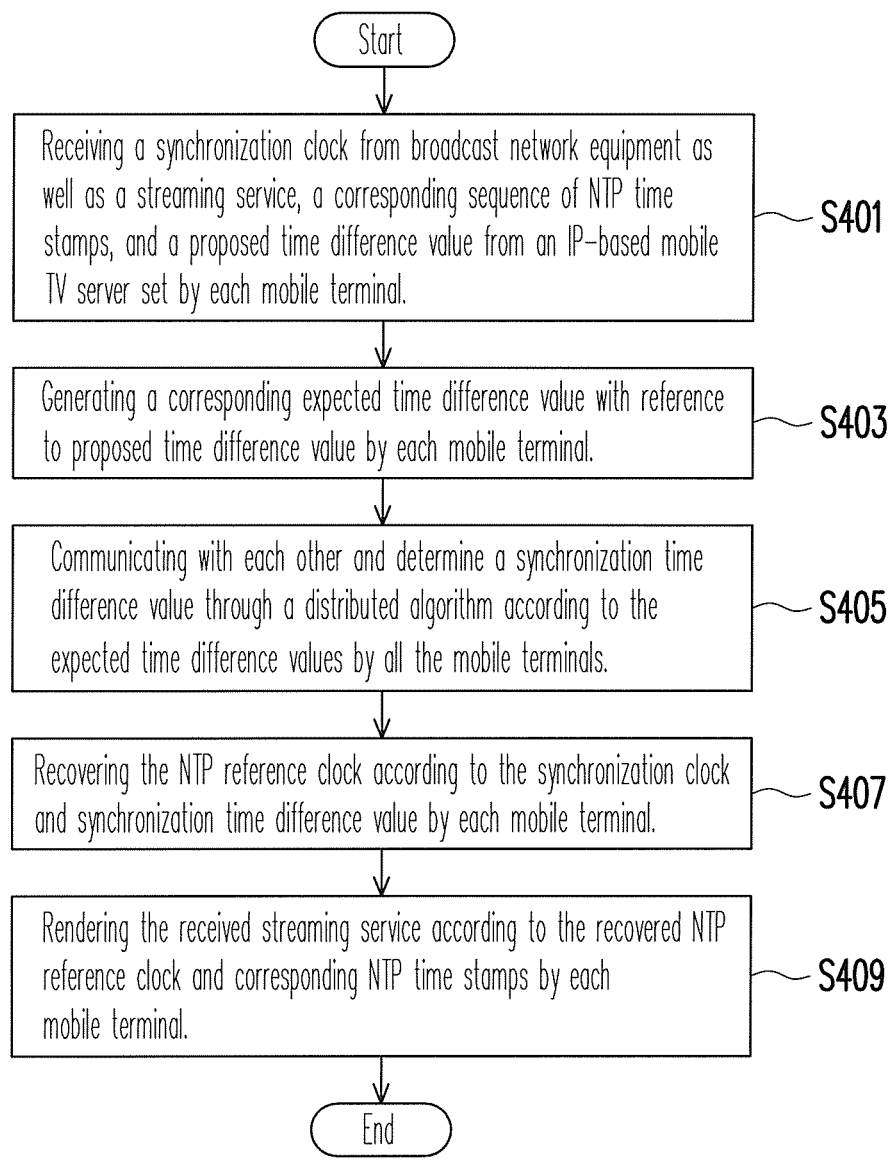
FIG. 5 is a flow chart of a method for synchronizing the rendering of a streaming service according to the first exemplary embodiment of the disclosure.

FIG. 5 is a flow chart of a method for synchronizing the rendering of the streaming service according to the first exemplary embodiment of the disclosure.

Referring to FIG. 5, in Step S401, each mobile terminal receives a synchronization clock $C_{sync}$ from the broadcast network equipment 104 as well as a streaming service, a corresponding sequence of the NTP time stamps $T_{NTP}$, and a proposed time difference value $dT_{def-r}$ from the IP-based mobile TV server set 102. Then, in Step S403, each mobile terminal generates a corresponding expected time difference value $dT_{Exp}$ with reference to the proposed time difference value $dT_{def-r}$. In Step S405, all the mobile terminals then communicate with each other and determine a synchronization time difference value $dT_{sync}$ through a distributed algorithm according to the expected time difference values $dT_{Exp\_i}$. Finally, in Step S407, each mobile terminal recovers the NTP reference clock $C_{NTP-R}$ according to the synchronization clock $C_{sync}$ and the synchronization time difference value $dT_{sync}$. In Step S409, each mobile terminal renders the received streaming service according to the recovered NTP reference clock $C_{NTP-R}$ and the corresponding NTP time stamps $T_{NTP}$.

The Second Exemplary Embodiment

Figure 6:
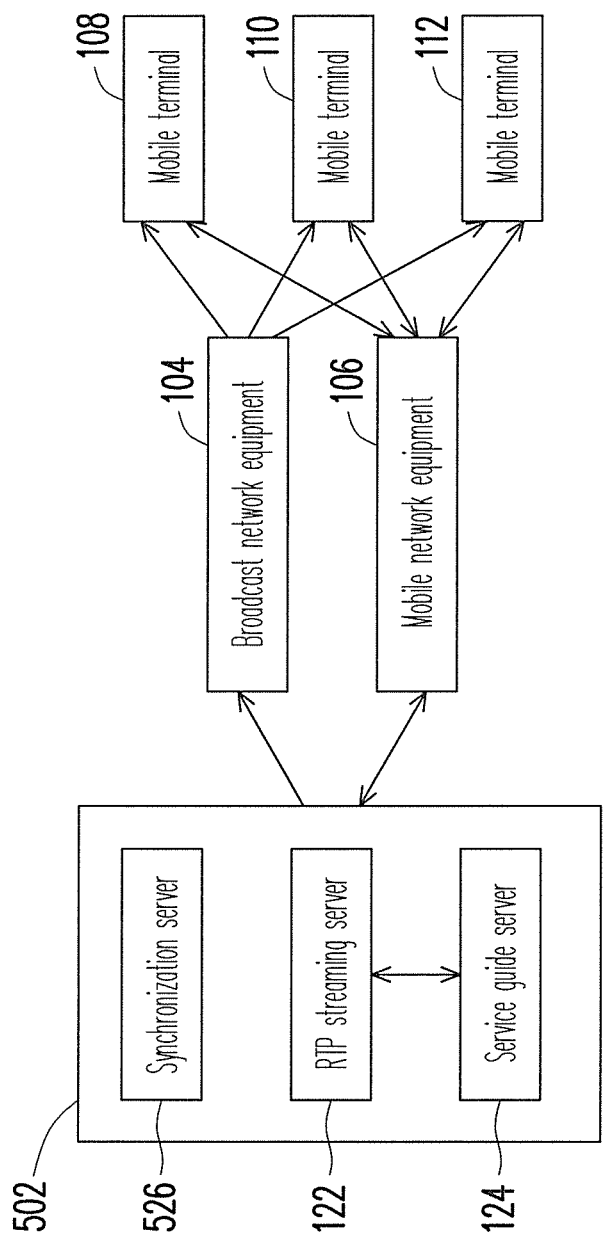
FIG. 6 is a schematic block diagram of a mobile TV system according to the second exemplary embodiment of the disclosure.

FIG. 6 is a schematic block diagram of a mobile TV system according to the second exemplary embodiment of the disclosure.

Referring to FIG. 6, a mobile TV system 500 includes an Internet Protocol (IP)-Based mobile TV server set 502, broadcast network equipment 104, mobile network equipment 106, a mobile terminal 108, a mobile terminal 110, and a mobile terminal 112. Since the structures and functions of the broadcast network equipment 104, the mobile network equipment 106, the mobile terminal 108, the mobile terminal 110, and the mobile terminal 112 are the same as the ones in the first exemplary embodiment, the descriptions of them are not repeated here.

The IP-based mobile TV server set 502 is a set of IP-based headend server required during the operation of the mobile TV system 500. In this exemplary embodiment, the IP-based mobile TV server set 502 transmits a streaming service and a sequence of Network Time Protocol (NTP) time stamps corresponding to the streaming service through the Real-time Transport Protocol (RTP). The IP-based mobile TV server set 502 includes an RTP streaming server 122, a service guide server 124, and a synchronization server 526. Since the structures and functions of the RTP streaming server 122 and the service guide server 124 are the same as the ones in the first exemplary embodiment, the descriptions of them are not repeated here.

The synchronization server 526 receives the expected time difference values $dT_{Exp\_i}$ transmitted from all the mobile terminals (that is, the mobile terminal 108, the mobile terminal 110, and the mobile terminal 112), and then calculate a common time difference value as the synchronization time difference value $dT_{sync}$, which is able to be used in all the mobile terminals, according to the expected time difference values $dT_{Exp\_i}$ of all the mobile terminals. Then, the synchronization server 526 returns the synchronization time difference value $dT_{sync}$ to all the mobile terminals through the broadcast network equipment 104 or the mobile network equipment 106. Specifically, in this exemplary embodiment, the mobile terminal 108, the mobile terminal 110, and the mobile terminal 112 transmit the expected time difference values calculated by the rendering synchronization module to the synchronization server 526 through the 3rd Generation Partnership Project (3GPP) Universal Mobile Telecommunications System (UMTS) transmission/reception module. Then, the synchronization server 526 calculates the synchronization time difference value $dT_{sync}$ and returns it to the mobile terminal 108, the mobile terminal 110, and the mobile terminal 112. Especially, the Formula (1) still has to be met when the synchronization server 526 determines the synchronization time difference value $dT_{sync}$.

Figure 7:
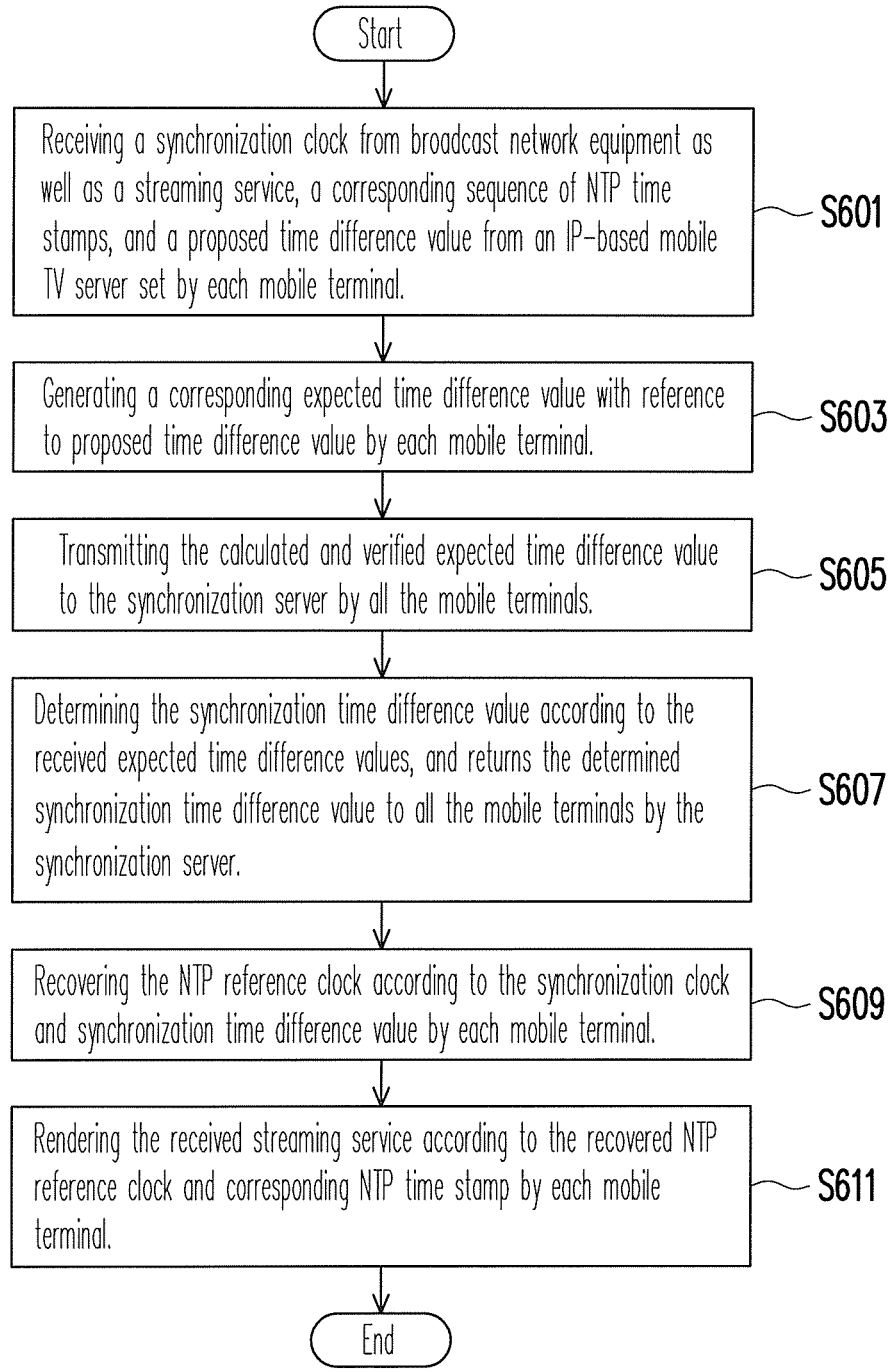
FIG. 7 is a flow chart of a method for synchronizing the rendering of a streaming service according to the second exemplary embodiment of the disclosure.

FIG. 7 is a flow chart of a method for synchronizing the rendering of a streaming service according to the second exemplary embodiment of the disclosure.

Referring to FIG. 7, in Step S601, each mobile terminal receives a synchronization clock $C_{sync}$ from the broadcast network equipment 104 as well as a streaming service, a corresponding sequence of the NTP time stamps $T_{NTP}$, and a proposed time difference value $dT_{def-r}$ from the IP-based mobile TV server set 502. Then, in Step S603, each mobile terminal generates a corresponding expected time difference value $dT_{Exp\_i}$ with reference to the proposed time difference value $dT_{def-r}$. In Step S605, all the mobile terminals then transmit the calculated and verified expected time difference value $dT_{Exp\_i}$ to the synchronization server 526. Subsequently, in Step S607, the synchronization server 526 determines the synchronization time difference value $dT_{sync}$ according to the received expected time difference values $dT_{Exp\_i}$, and return the determined synchronization time difference value $dT_{sync}$ to all the mobile terminals. Finally, in Step S609, each mobile terminal recovers the NTP reference clock $C_{NTP-R}$ according to the synchronization clock $C_{sync}$ and the synchronization time difference value $dT_{sync}$. In Step S611, each mobile terminal renders the received streaming service according to the recovered NTP reference clock $C_{NTP-R}$ and the corresponding NTP time stamps $T_{NTP}$.

It should be noted that in the first exemplary embodiment and in the second exemplary embodiment, the service guide server 124 transmits the proposed time difference value $dT_{def-r}$ to the mobile terminal 108, the mobile terminal 110, and the mobile terminal 112. The mobile terminal 108, the mobile terminal 110, and the mobile terminal 112 respectively generate a corresponding expected time difference value $dT_{Exp\ i}$ with reference to the proposed time difference value $dT_{def-r}$. However, in another exemplary embodiment of the disclosure, the service guide server 124 may also not transmit the proposed time difference value $dT_{def-r}$ to the mobile terminal 108, the mobile terminal 110, and the mobile terminal 112. Specifically, the mobile terminal may not refer to the proposed time difference value $dT_{def-r}$ when generating the expected time difference value $dT_{Exp\ i}$. For example, the rendering synchronization module of a mobile terminal may be able to find an expected time difference value $dT_{Exp\ i}$ with some adjustment that are based on the time difference between the synchronization clock $C_{sync}$ and the clock $C_{NTP}$ of the RTP streaming service.

The Third Exemplary Embodiment

Figure 8:
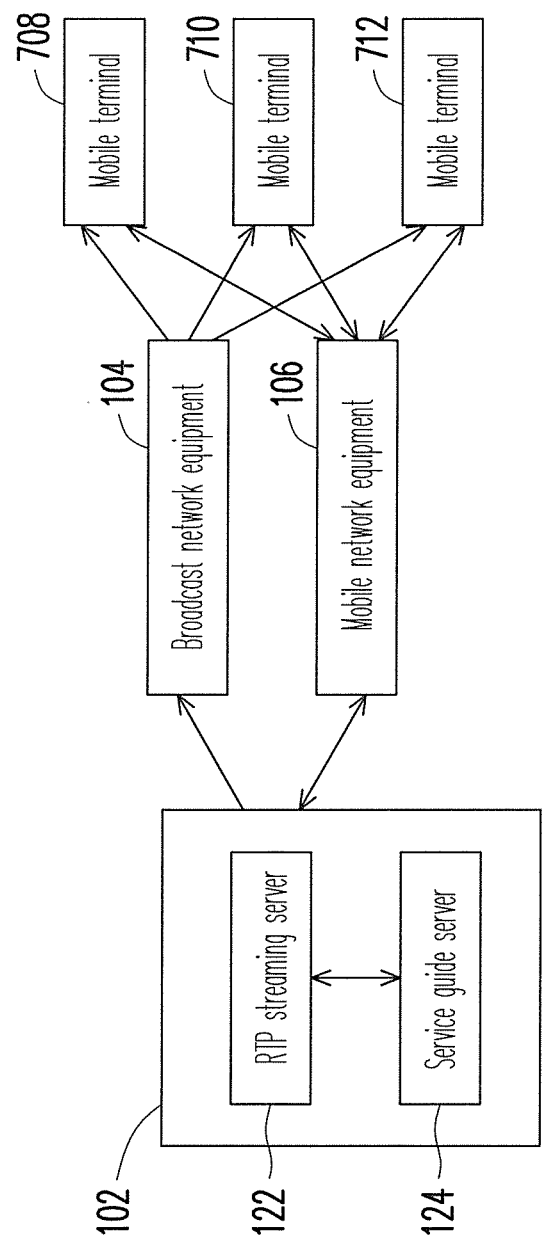
FIG. 8 is a schematic block diagram of a mobile TV system according to the third exemplary embodiment of the disclosure.

FIG. 8 is a schematic block diagram of a mobile TV system according to the third exemplary embodiment of the disclosure.

Referring to FIG. 8, a mobile TV system 700 includes an Internet Protocol (IP)-Based mobile TV server set 102, broadcast network equipment 104, mobile network equipment 106, a mobile terminal 708, a mobile terminal 710, and a mobile terminal 712. Since the structures and functions of the IP-based mobile TV server set 102, the broadcast network equipment 104, and the mobile network equipment 106 are similar to those described in the first exemplary embodiment, only the different parts are described below.

The mobile terminal 708, the mobile terminal 710, and the mobile terminal 712 are user terminal devices with which users receive and watch a mobile TV streaming service. In this exemplary embodiment, the mobile terminal 708, the mobile terminal 710, and the mobile terminal 712 receive a streaming service and a corresponding sequence of Network Time Protocol (NTP) time stamps $T_{NTP}$ from the broadcast network equipment 104. In addition, the mobile terminal 708, the mobile terminal 710, and the mobile terminal 712 receive a synchronization clock $C_{sync}$ from the broadcast network equipment 104.

In this exemplary embodiment, each mobile terminal (that is, the mobile terminal 708, the mobile terminal 710, and the mobile terminal 712) receives a proposed time difference value $dT_{def-r}$ coming from the IP-based mobile TV server set 102 through the broadcast network equipment 104 or the mobile network equipment 106, and inputs an expected fine-tuning value $ddT_{Exp\ i}$ to fine-tune the proposed time difference value $dT_{def-r}$ in order to generate the expected time difference value $dT_{Exp}$ (that is, expected time difference value $dT_{Exp\ i}$=proposed time difference value $dT_{def-r}$+expected fine-tuning value $ddT_{Exp\ i}$). A successful fine-tuning means that the mobile terminal is able to render the streaming service successfully at the rendering time recovered by the expected time difference value $dT_{Exp\ i}$ that is generated by the fine-tuning. Especially, all the mobile terminals coordinate and confirm a common fine-tuning value $ddT_{sync}$ according to all the expected fine-tuning values $ddT_{Exp\ i}$ of all mobile terminals. The common fine-tuning value $ddT_{sync}$ is greater than or equals to all the expected fine-tuning values $ddT_{Exp\ i}$.

In this exemplary embodiment, each mobile terminal (that is, the mobile terminal 708, the mobile terminal 710, and the mobile terminal 712) calculates a synchronization time difference value $dT_{sync}$ through the proposed time difference value $dT_{def-r}$ and the common fine-tuning value $ddT_{sync}$ (that is, synchronization time difference value $dT_{sync}$=proposed time difference value $dT_{def-r}$+common fine-tuning value $ddT_{sync}$).

Figure 9:
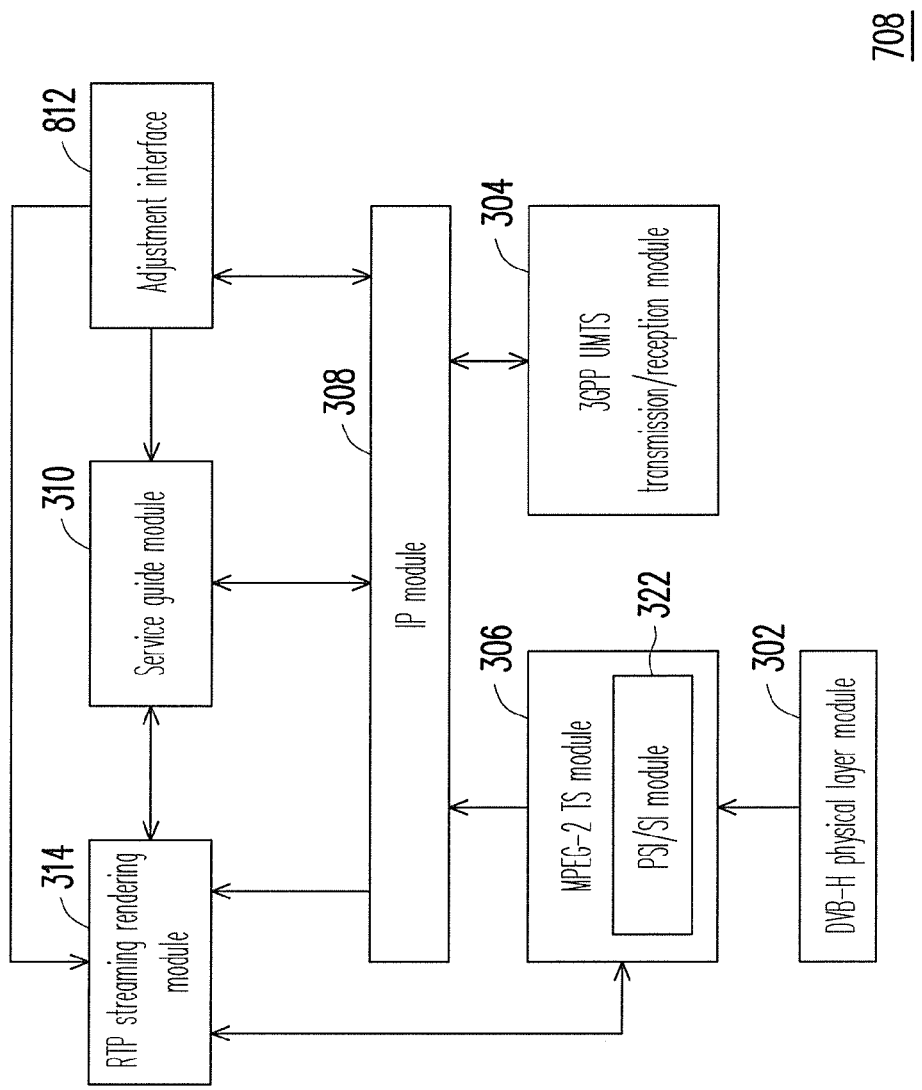
FIG. 9 is a schematic block diagram of the mobile terminal in FIG. 8.

FIG. 9 is a schematic block diagram of a mobile terminal in FIG. 8. Since the structures and functions of the mobile terminal 708, the mobile terminal 710, and the mobile terminal 712 are the same, the mobile terminal 708 is taken as an example for explanation.

Referring to FIG. 9, the mobile terminal 708 includes a Digital Video Broadcasting-Handheld (DVB-H) physical layer module 302, a 3rd Generation Partnership Project (3GPP) Universal Mobile Telecommunications System (UMTS) transmission/reception module 304, a Moving Picture Experts Group (MPEG)-2 Transport Stream (TS) module 306, an IP module 308, a service guide module 310, an adjustment interface 812, and a Real-time Transport Protocol (RTP) streaming rendering module 314. Since the structures and functions of the DVB-H physical layer module 302, the 3GPP UMTS transmission/reception module 304, the MPEG-2 TS module 306, the IP module 308, and the service guide module 310 are the same as the ones in the first exemplary embodiment, the descriptions thereof are not repeated here.

The adjustment interface 812 is configured to input the expected fine-tuning values (for example, the expected fine-tuning value $ddT_{Exp}$ 1 of the mobile terminal 708), so as to coordinate the common fine-tuning value $ddT_{sync}$ with adjustment interfaces of other mobile terminals through the 3GPP UMTS transmission/reception module 304. Then, the coordinated common fine-tuning value $ddT_{sync}$ is transmitted to the RTP streaming rendering module 314. In addition, in another exemplary embodiment of the disclosure, the common fine-tuning value $ddT_{sync}$ may be coordinated from the expected fine-tuning values $ddT_{Exp\ i}$ that are input through the adjustment interfaces of all the mobile terminals in other manners.

The RTP streaming rendering module 314 calculates the synchronization time difference value $dT_{sync}$ according to the received proposed time difference value $dT_{def-r}$ and the common fine-tuning value $ddT_{sync}$.

Subsequently, the RTP streaming rendering module 314 is then able to recover the NTP reference clock $C_{NTP-R}$ according to both the synchronization time difference value $dT_{sync}$ and the synchronization clock $C_{sync}$ received from the Program-Specific Information (PSI)/Service Information (SI) module 322. Then, the RTP streaming rendering module 314 renders the received streaming service according to the recovered NTP reference clock $C_{NTP-R}$ and the corresponding NTP time stamps $T_{NTP}$.

Figure 10:
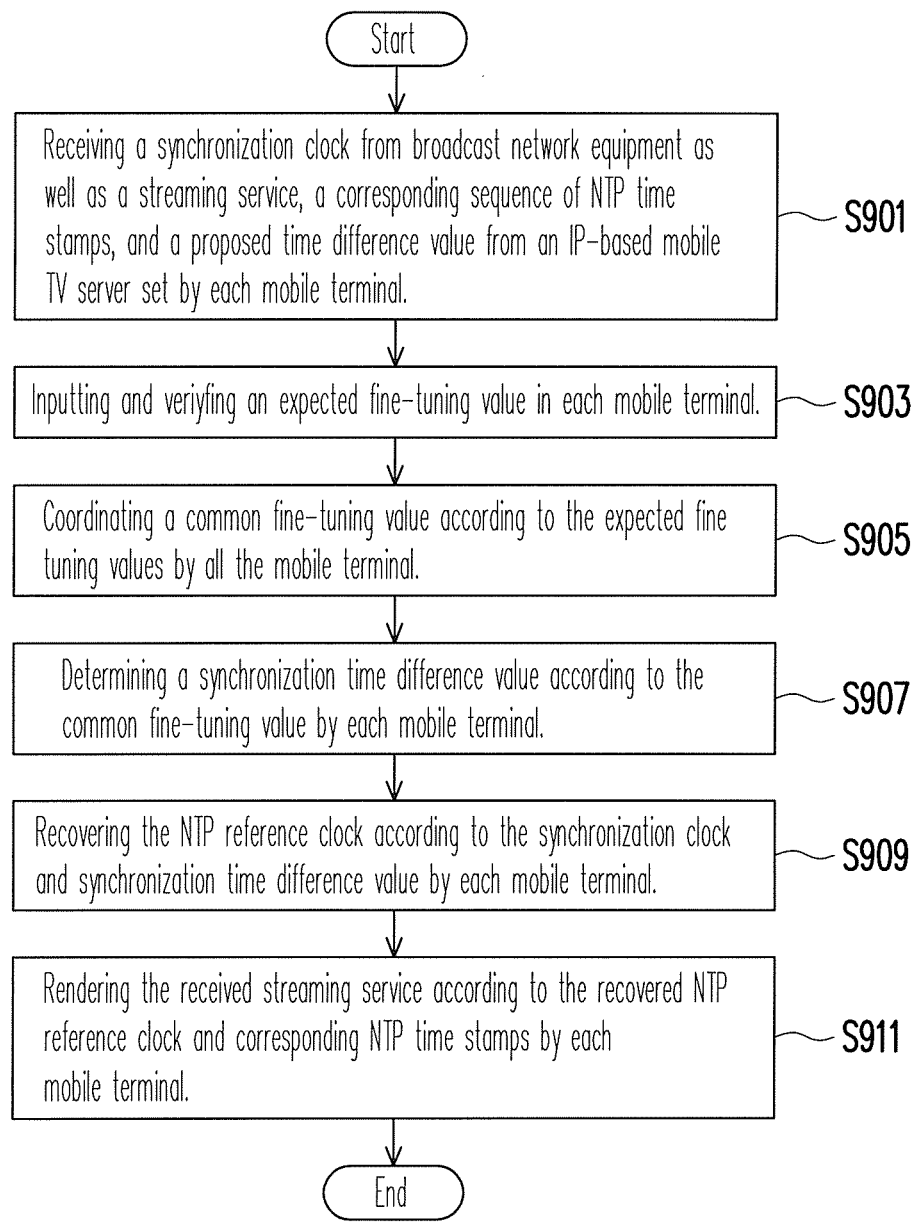
FIG. 10 is a flow chart of a method for synchronizing the rendering of a streaming service according to the third exemplary embodiment of the disclosure.

FIG. 10 is a flow chart of a method for synchronizing the rendering of the streaming service according to the third exemplary embodiment of the disclosure.

Referring to FIG. 10, in Step S901, each mobile terminal receives a synchronization clock $C_{sync}$ from the broadcast network equipment 104 as well as a streaming service, a corresponding sequence of the NTP time stamps $T_{NTP}$, and a proposed time difference value $dT_{def-r}$ from an IP-based mobile TV server set 102. Then, in Step S903, an expected fine-tuning value $ddT_{Exp\ i}$ is input and verified in each mobile terminal. In Step S905, all the mobile terminals coordinate a common fine-tuning value $ddT_{sync}$ according to the expected fine-tuning values $ddT_{Exp\ i}$ of all mobile terminals. In Step S907, each mobile terminal then determines a synchronization time difference value $dT_{sync}$ according to the common fine-tuning value $ddT_{sync}$. Finally, in Step S909, each mobile terminal recovers the NTP reference clock $C_{NTP-R}$ according to the synchronization clock $C_{sync}$ and the synchronization time difference value $dT_{sync}$. In Step S911, each mobile terminal renders the received streaming service according to the recovered NTP reference clock $C_{NTP-R}$ and the corresponding NTP time stamps $T_{NTP}$.

The Fourth Exemplary Embodiment

A schematic block diagram of a mobile TV system and a schematic block diagram of a mobile terminal according to the fourth exemplary embodiment are the same as those in FIGS. 8 and 9, respectively. FIGS. 8 and 9 are used to demonstrate the fourth exemplary embodiment in the following. Especially, the mobile TV system in the fourth exemplary embodiment is essentially the same as the mobile TV system in the third exemplary embodiment, and the different parts are illustrated below.

In the third exemplary embodiment, the mobile terminal 708, the mobile terminal 710, and the mobile terminal 712 coordinate and confirm a common fine-tuning value $ddT_{sync}$ according to their expected fine-tuning values $ddT_{Exp\ i}$. However, in this exemplary embodiment, the mobile terminal 708, the mobile terminal 710, and the mobile terminal 712 calculate the synchronization time difference value $dT_{sync}$ according to the proposed time difference value $dT_{def-r}$ and a uniform expected fine-tuning value $ddT_{Exp-c}$ (that is, synchronization time difference value $dT_{sync}$=proposed time difference value $dT_{def-r}$+uniform expected fine-tuning value $ddT_{Exp-c}$).

In this exemplary embodiment, each mobile terminal (that is, the mobile terminal 708, the mobile terminal 710, and the mobile terminal 712) receives a proposed time difference value $dT_{def-r}$ coming from the IP-based mobile TV server set 102 through the broadcast network equipment 104 or the mobile network equipment 106, and generates an expected time difference value $dT_{Exp\ i}$ commonly with reference to the proposed time difference value $dT_{def-r}$ and a uniform expected fine-tuning value $ddT_{Exp-c}$, that is, the expected time difference values $dT_{Exp\ i}$ generated by respective mobile terminals are the same (the expected time difference values $dT_{Exp\ i}$ of each mobile terminal=the proposed time difference value $dT_{def-r}$+the uniform expected fine-tuning value $ddT_{Exp-c}$). Especially, each mobile terminal communicate with each other after fine-tuning to confirm whether all the mobile terminals are able to render the streaming service successfully at a rendering time recovered by the expected time difference values $dT_{Exp\ i}$ generated according to the fine-tuning. If one of the mobile terminals is not able to render the streaming service successfully at the rendering time recovered by the expected time difference values $dT_{Exp\ i}$ generated according to the fine-tuning, all the mobile terminals generate another expected time difference value $dT_{Exp\ i}$ again through another uniform expected fine-tuning value $ddT_{Exp-c}$. Otherwise, when all the mobile terminals are able to render the streaming service successfully at the rendering time recovered by the expected time difference values $dT_{Exp\ i}$ generated according to the fine-tuning, all the mobile terminals calculate a synchronization time difference value $dT_{sync}$ through the final uniform expected fine-tuning value $ddT_{Exp-c}$.

Figure 11:
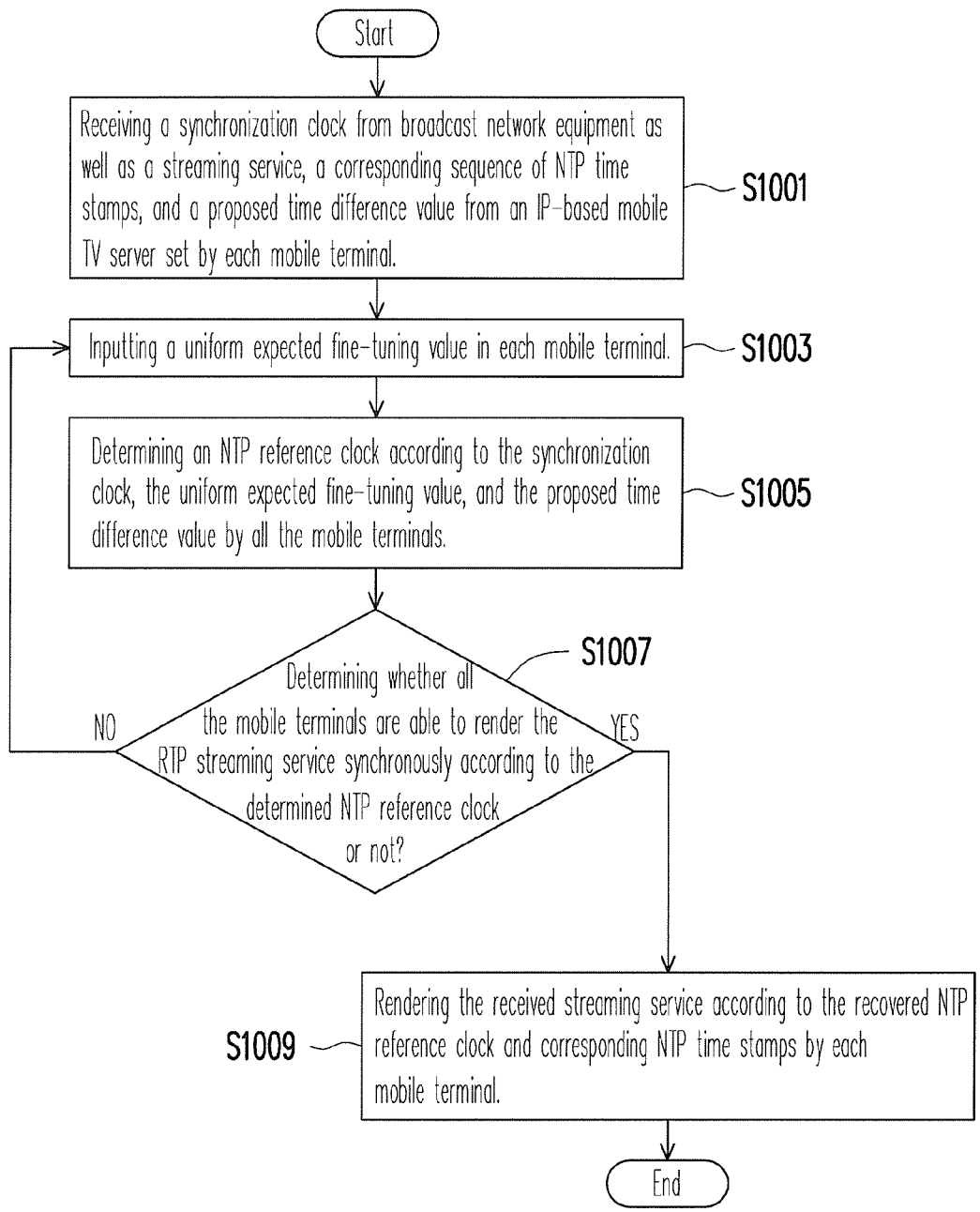
FIG. 11 is a flow chart of a method for synchronizing the rendering of a streaming service according to the fourth exemplary embodiment of the disclosure.

FIG. 11 is a flow chart of a method for synchronizing the rendering of the streaming service according to a fourth exemplary embodiment of the disclosure.

Referring to FIG. 11, in Step S1001, each mobile terminal receives a synchronization clock $C_{sync}$ from the broadcast network equipment 104 as well as a streaming service, a corresponding sequence of Network Time Protocol (NTP) time stamps $T_{NTP}$, and a proposed time difference value $dT_{def-r}$ from an Internet Protocol (IP)-Based mobile TV server set 102. Then, in Step S1003, a uniform expected fine-tuning value $ddT_{Exp-c}$ is input in each mobile terminal. In Step S1005, all the mobile terminals then determine an NTP reference clock $C_{NTP-R}$ according to the synchronization clock $C_{sync}$, the uniform expected fine-tuning value $ddT_{Exp-c}$, and the proposed time difference value $dT_{def-r}$. Subsequently, in Step S1007, it is determined whether all the mobile terminals (that is, the mobile terminal 708, the mobile terminal 710, and the mobile terminal 712) are able to present the Real-time Transport Protocol (RTP) streaming service synchronously according to the determined NTP reference clock $C_{NTP-R}$. If in Step S1007 not all the mobile terminals are able to present the RTP streaming service synchronously, Step S1003 is performed to input another uniform expected fine-tuning value $ddT_{Exp-c}$ again; otherwise, each mobile terminal renders the received streaming service according to the recovered NTP reference clock $C_{NTP-R}$ and the corresponding NTP time stamps $T_{NTP}$ in Step S1009.

The Fifth Exemplary Embodiment

Figure 12:
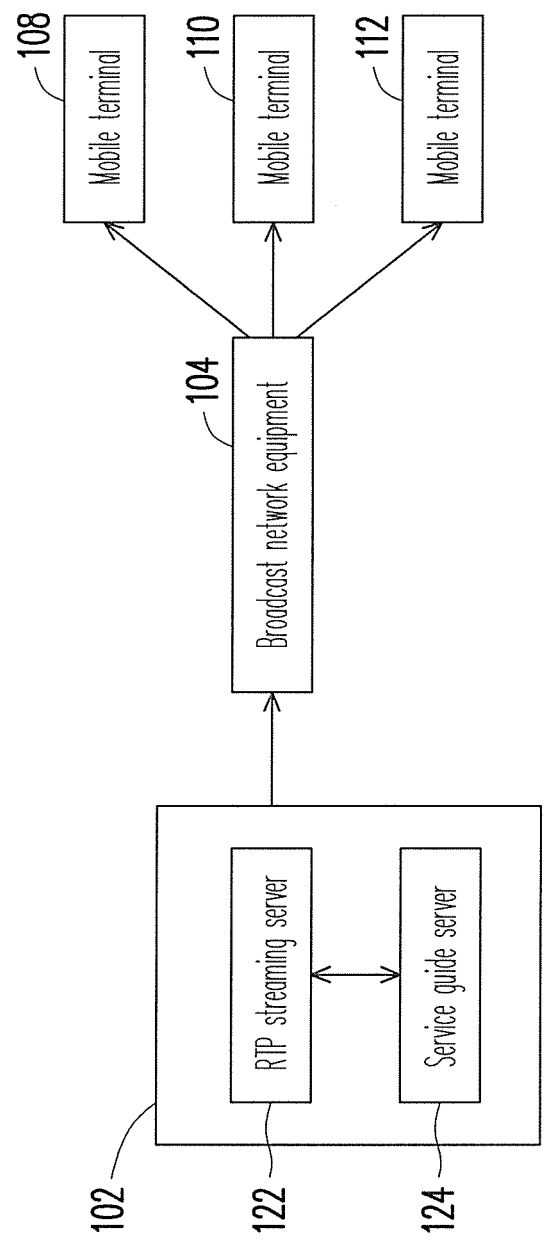
FIG. 12 is a schematic block diagram of a mobile TV system according to the fifth exemplary embodiment of the disclosure.

FIG. 12 is a schematic block diagram of a mobile TV system according to a fifth exemplary embodiment of the disclosure.

Referring to FIG. 12, a mobile TV system 1200 includes an Internet Protocol (IP)-based mobile TV server set 102, broadcast network equipment 104, a mobile terminal 108, a mobile terminal 110, and a mobile terminal 112. Since the structures and functions of the IP-based mobile TV server set 102, the broadcast network equipment 104, the mobile terminal 108, the mobile terminal 110, and the mobile terminal 112 are elaborated above, and only the different parts are described below.

In this exemplary embodiment, the service guide server 124 transmits SDP description for a streaming service through the broadcast network equipment 104 (as shown in FIG. 13), so as to transmit an available time difference value $dT_{def-u}$ for the streaming service to the mobile terminal (that is, the mobile terminal 108, the mobile terminal 110, and the mobile terminal 112). Here, the available time difference value $dT_{def-u}$ may directly enable the mobile terminal 108, the mobile terminal 110, and the mobile terminal 112 to render the streaming service successfully at the rendering time recovered according to the available time difference value $dT_{def-u}$. That is to say, when a service guide module of the mobile terminal receives an available time difference value $dT_{def-u}$ from the service guide server 124, a rendering synchronization module 312 of the mobile terminal sets the synchronization time difference value $dT_{sync}$ as the available time difference value $dT_{def-u}$ (for example, Formula (2)):

$$dT_{sync}=dT_{def-u} \qquad (2)$$

Subsequently, each mobile terminal generates a Network Time Protocol (NTP) reference clock $C_{NTP-R}$ according to a synchronization clock $C_{sync}$ and a synchronization time difference value $dT_{sync}$, and renders the received streaming service according to the generated NTP reference clock $C_{NTP-R}$ and the corresponding NTP time stamps $T_{NTP}$.

More specifically, in this exemplary embodiment, an available time difference value $dT_{def-u}$ has a compulsory sense, that is, each mobile terminal has to generate an NTP reference clock $C_{NTP-R}$ according to the available time difference value $dT_{def-u}$, and each mobile terminal has to be capable of rendering the streaming service according to the abovementioned NTP reference clock $C_{NTP-R}$. Therefore, a standard manner that the IP-based mobile TV server set 102 calculates the available time difference value $dT_{def-u}$ for a Real-time Transport Protocol (RTP) streaming service has to be specified in the IP-based mobile TV system 1200. In addition, the performance of the implementations of the mobile terminals in the IP-based mobile TV system 1200 (that is, the mobile terminal 108, the mobile terminal 110, and the mobile terminal 112) have to strictly follow some specific requirements on some parameters, so as to comply with the standard of the IP-based mobile TV system 1200. Basically, the specific parameters are the parameters required for the IP-based mobile TV server set 102 to calculate the available time difference value $dT_{def-u}$. For example, the rendering initial delay $T_{ID}$ of a mobile terminal implementation has to be lower than a specific value specified by an IP-based mobile TV system 1200 standard. Specifically, the rendering initial delay $T_{ID}$ is a difference of time from that the mobile terminal receives the first packet of an RTP streaming service to that the mobile terminal starts to display the RTP streaming service in the case that the synchronization method proposed in the exemplary embodiment is not considered. It is assumed here that the greatest rendering initial delay $T_{ID}$ of the mobile terminal has to be less than or equal to the rendering initial delay specified by an IP-based mobile TV system 1200 when the mobile terminal receives any RTP streaming service from the broadcast network equipment 104. Since the rendering initial delay $T_{ID}$ value is compulsory, all the mobile terminals have to decrease the causes that may result in longer rendering initial delay in practice, for example, the Multi-Protocol Encapsulation (MPE)-Forward Error Correction (FEC) decoding delay, the initial buffering delay of an A/V decoder, and the like, so as to meet the requirement in the aspect of performance.

The following is the exemplary detailed description of a specific method for specifying the relationship between the available time difference value $dT_{def-u}$ and the rendering initial delay $T_{ID}$ on a Digital Video Broadcasting (DVB) mobile TV system (for example, the DVB-H). In the example, an available time difference value $dT_{def-u}$ has to meet the following formula (3) and formula (4):

$$dT_{def-u} \geq (C_{IPE}-C_{NTP})+T_{ED}+T_{ID} \qquad (3)$$

$$C_{ITE}-C_{NTP}=(C_{RTP\ Server}-C_{NTP})+E_{IR}+T_{ND} \qquad (4)$$

$C_{IPE}$ denotes the clock configured to set the Time and Date Table (TDT) or the Time and Offset Table (TOT) in the broadcast network equipment 104, which is implemented in an IP encapsulator (not shown) in the broadcast network equipment 104.

$T_{ED}$ denotes the possible greatest delay time between that the RTP packet is received by the IP encapsulator and that the RTP packet is added in a Moving Picture Experts Group (MPEG)-2 Transport Stream (TS) output by the IP encapsulator.

$C_{RTP\ Server}$ denotes a clock that is provided in the RTP streaming server 122 in the IP-based mobile TV server set 102, which is synchronized with the clock $C_{IPE}$. The RTP streaming server 122 uses the clock $C_{RTP\ Server}$ as a reference clock to control the start and end of the transmission of the RTP streaming service.

$E_{IR}$ is related to the schemes of implementing the synchronization between the clock $C_{IPE}$ and the clock $C_{RTP\ Server}$, and such synchronization may be implemented by using the NTP (RFC 1305) or other communication protocols having the same functions. It is assumed here that the $E_{IR}$ is the possible maximum value of the synchronization error between the clock $C_{IPE}$ and the clock $C_{RTP\ Server}$.

$T_{ND}$ denotes the possible maximum network transmission delay time that the RTP packet is transmitted from the RTP streaming server 122 to the IP encapsulator. Specifically, since the RTP streaming service transmitted by the RTP streaming server 122 is first sent to the IP encapsulator, and then inserted into an MPEG-2 TS to be broadcast together with the TDT or TOT, a network transmission delay time may occur in the process.

In Formula (3), $(C_{IPE}-C_{NTP})$ denotes a time difference between the clock $C_{IPE}$ and the clock of the NTP time stamps in the Real-time Transport Control Protocol (RTCP) Sender Report (SR) packets of the RTP streaming service that is observed on the IP encapsulator.

In addition, the maximum rendering initial delay has to be specified in the related standards of the IP-based mobile TV system 1200. That is to say, the current IP-based service-layer standards related to the DVB-H, that is, the DVB-IPDC or the OMA BCAST, have to be expanded to incorporate the limitation on the maximum rendering initial delay on the compliant mobile terminals so as to be compatible with the IP-based mobile TV system 1200. Consequently, the aforementioned rendering initial delay $T_{ID}$ can be treated as a constant since it is bounded to the maximum rendering initial delay specified in the related standards of the IP-based mobile TV system 1200, and its value is not related to the RTP streaming service rendered by the mobile terminal.

In other words, as shown in FIG. 12, the mobile terminal 108, the mobile terminal 110, and the mobile terminal 112 have to comply to the limitation of the rendering initial delay $T_{ID}$. On the contrary, three parameters $E_{IR}$, $T_{ND}$, and $T_{ED}$ are variables that are able to be obtained when the IP-based mobile TV server set 102 and the broadcast network equipment 104 in FIG. 12 are implemented or deployed. That is, values of the three parameters may be different according to differences in the manners of implementation and establishment of the IP-based mobile TV server set or the broadcast network equipment.

In addition, since the first RTCP SR packet of an RTP streaming service is not necessarily to be transmitted at the same moment when the transmission of the RTP streaming service starts. Therefore, in Formula (4), $(C_{RTP\ Server}-C_{NTP})$ denotes a difference of time between the clock $C_{RTP\ Server}$ and the clock of the NTP time stamps in the RTCP SR packets of the RTP streaming service, which is observed on the RTP streaming server 122, as shown in Formula (5):

$$C_{RTP\ Server}-C_{NTP}=T_{RS}-T_{FN}+T_{RD} \qquad (5)$$

$T_{RS}$ denotes a time that the RTP streaming server 122 starts to transmit the RTP streaming service. The time is based on the clock $C_{RTP\ Server}$. $T_{FN}$ is a time value of an NTP time stamp of the first RTCP SR packet in the RTP streaming service. $T_{RD}$ is a relative difference of time between that the RTP streaming service starts to be transmitted and that the first RTCP SR packet starts to be transmitted. The value of $T_{RD}$ may be obtained in an estimation manner, for example, in this exemplary embodiment, through the following arithmetic expressions:

$T_{RD}$ value=(the total size of the packet data transmitted for the RTP streaming service before the transmission of the first RTCP SR packet)/(the bandwidth allocated for the RTP streaming server 122 to transmit the RTP streaming service)

In addition, in another exemplary embodiment of the disclosure, the value of $T_{RD}$ may also be obtained through actual measurement. For example, before an RTP streaming service starts to be officially delivered by the RTP streaming server 122, the value of $T_{RD}$ can be obtained by measurement through an internal pre-run process inside the RTP streaming server 122.

It should be understood that the aforementioned formulas for calculating the available time difference value $dT_{def-u}$ are only for example, and the disclosure is not limited thereto. In addition, in this exemplary embodiment, the formulas for calculating the available time difference value $dT_{def-u}$ may be applied to calculate proposed time difference values $dT_{def-r}$ in the first, second, third, and fourth exemplary embodiments.

Figure 14:
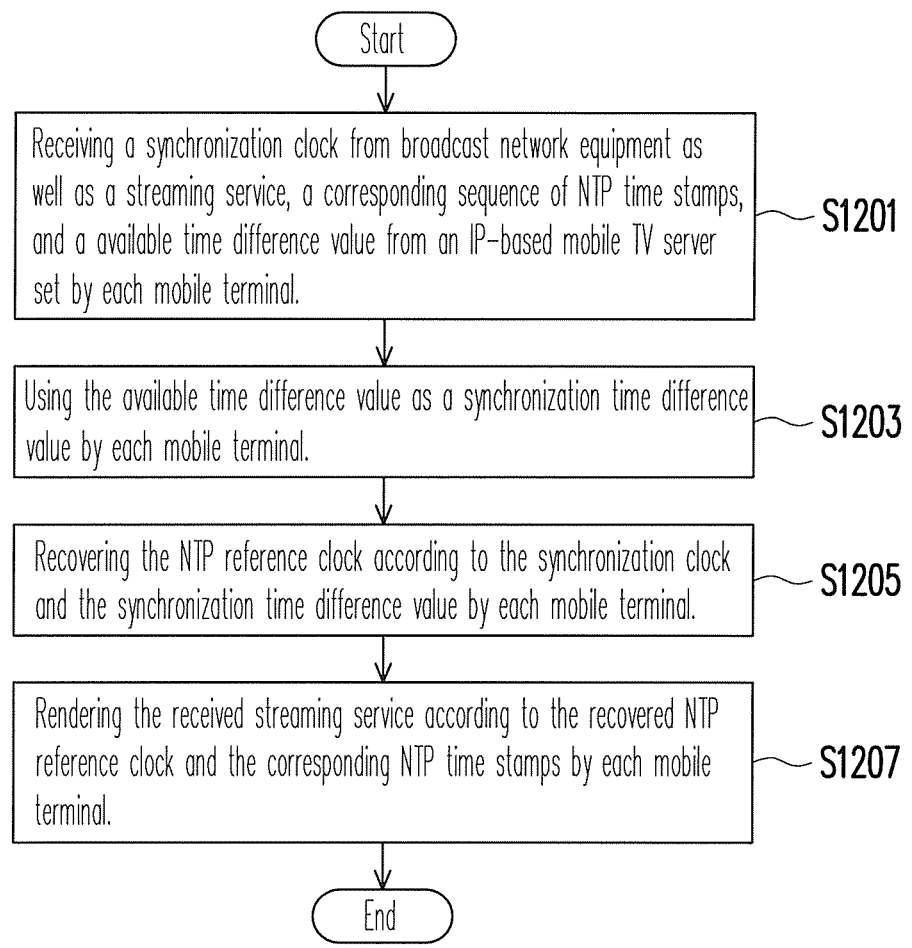
FIG. 14 is a flow chart of a method for synchronizing the rendering of a streaming service according to the fifth exemplary embodiment of the disclosure.

FIG. 14 is a flow chart of the method for synchronizing the rendering of a streaming service according to the fifth exemplary embodiment of the disclosure.

Referring to FIG. 14, in Step S1201, each mobile terminal receives a synchronization clock $C_{sync}$ from broadcast network equipment 104 as well as a streaming service, a corresponding sequence of NTP time stamps $T_{NTP}$, and an available time difference value $dT_{def-u}$ from the IP-based mobile TV server set 102. Then, in Step S1203, each mobile terminal uses the time difference value $dT_{def-u}$ as the synchronization time difference value $dT_{sync}$. Finally, in Step S1205, each mobile terminal recovers the NTP reference clock $C_{NTP-R}$ according to the synchronization clock $C_{sync}$ and the synchronization time difference value $dT_{sync}$. In Step S1207, each mobile terminal renders the received streaming service according to the recovered NTP reference clock $C_{NTP-R}$ and the corresponding NTP time stamps $T_{NTP}$.

In conclusion, the exemplary embodiments of the disclosure are able to solve the problem of rendering synchronization of the RTP streaming service on a plurality of mobile terminals in the IP-Based mobile TV system. In addition, the exemplary embodiments of the disclosure are able to avoid the problem of being inapplicable on the IP-Based mobile TV system to transmit an in-band reference clock of RTP.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. A mobile TV system, comprising:
   an Internet Protocol (IP)-based mobile TV server set, configured to transmit a streaming service and a sequence of Network Time Protocol (NTP) time stamps corresponding to the streaming service through a Real-time Transport Protocol (RTP);
   a network equipment, configured to provide at least one broadcast network equipment to transport the streaming service and the sequence of NTP time stamps; and
   a plurality of mobile terminals, each receiving the streaming service, the sequence of the NTP time stamps, and a synchronization clock from the network equipment,
   wherein the IP-based mobile TV server set further comprises a service guide server, the service guide server transmits related information of the transmitted streaming service to each of the mobile terminals, wherein the related information comprises a synchronization time difference value specific to the streaming service and the synchronization time difference value is within session description protocol description,
   wherein each of the mobile terminals receives the related information of the transmitted streaming service before receiving the streaming service, recovers an NTP reference clock for rendering the received streaming service according to the synchronization clock and the synchronization time difference value, and renders the received streaming service according to the recovered NTP reference clock and the received NTP time stamps.

2. The mobile TV system according to claim 1, wherein the IP-based mobile TV server set comprise an RTP streaming server, which is configured to transmit the streaming service and the sequence of the NTP time stamps corresponding to the streaming service.

3. The mobile TV system according to claim 2, wherein each of the mobile terminals receives an available time difference value from the service guide server through the network equipment to serve as the synchronization time difference value.

4. The mobile TV system according to claim 2, wherein each of the mobile terminals calculates an expected time difference value,
   wherein the synchronization time difference value is determined according to the expected time difference values, and the synchronization time difference value is not less than all the expected time difference values.

5. The mobile TV system according to claim 4, wherein each of the mobile terminals receives a proposed time difference value from the service guide server through the network equipment, and each of the mobile terminals calculates the expected time difference value according to the proposed time difference value.

6. The mobile TV system according to claim 4, wherein each of the mobile terminals determines the synchronization time difference value through a distributed algorithm according to the expected time difference values.

7. The mobile TV system according to claim 4, wherein the IP-based mobile TV server set further comprises a synchronization server,
   each of the mobile terminals transmits the calculated expected time difference values to the synchronization server through the network equipment,
   the synchronization server determines a common time difference value according to the expected time difference values and transmits the common time difference value to the mobile terminals through the network equipment, and
   each of the mobile terminals takes the common time difference value as the synchronization time difference value.

8. The mobile TV system according to claim 2,
   wherein each of the mobile terminals further comprises an adjustment interface,
   each of the mobile terminals receives a proposed time difference value from the service guide server through the network equipment, and the adjustment interface of each of the mobile terminals is configured to input an expected fine-tuning value,
   the adjustment interfaces of the mobile terminals coordinate a common fine-tuning value, and each of the mobile terminals determines the synchronization time difference value through the proposed time difference value and the common fine-tuning value, and
   the common fine-tuning value is not less than all the expected fine-tuning values.

9. The mobile TV system according to claim 2,
   wherein each of the mobile terminals further comprises an adjustment interface,
   each of the mobile terminals receives a proposed time difference value from the service guide server through the network equipment, and the adjustment interface of each of the mobile terminals is configured to input a uniform expected fine-tuning value, and
   each of the mobile terminals determines the synchronization time difference value through the proposed time difference value and the uniform expected fine-tuning value.

10. The mobile TV system according to claim 2, wherein the RTP streaming server complies with a DVB-IPDC standard or an OMA BCAST standard.

11. The mobile TV system according to claim 1, wherein the network equipment comprises at least one broadcast network equipment and at least one mobile network equipment.

12. The mobile TV system according to claim 1, wherein the recovered NTP reference clock is defined as the value of the synchronization clock, and each of the received NTP time stamps is converted into a new NTP time stamp value by adding the original value of the received NTP time stamp and the synchronization time difference value.

13. The mobile TV system according to claim 1, wherein the recovered NTP reference clock is defined through the following expression:

$$C_{NTP-R} = C_{sync} - dT_{sync}$$

wherein $C_{NTP-R}$ represents the recovered NTP reference clock, $C_{sync}$ represents the synchronization clock and $dT_{sync}$, represents the synchronization time difference value.

14. The mobile TV system according to claim 1, wherein the synchronization time difference value is transmitted prior to a line having a prefix of "m=" in the session description protocol description of the transmitted streaming service.

15. A method for synchronizing the rendering of a streaming service in a mobile TV system, comprising:
transmitting a streaming service and a sequence of Network Time Protocol (NTP) time stamps corresponding to the streaming service through a Real-time Transport Protocol (RTP) via a network equipment by using an Internet Protocol (IP)-based mobile TV server set, wherein related information of the transmitted streaming service is transmitted to each of the mobile terminals, the related informatation comprises a synchronization time difference value specific to the streaming service and the synchronization time difference value is within session description protocol description;
receiving the streaming service, the sequence of NTP time stamps, and a synchronization clock from the network equipment by using a plurality of mobile terminals, wherein the related information of the transmitted streaming service is received by each of the mobile terminals before receiving the streaming service;
recovering an NTP reference clock for rendering the received streaming service according to the synchronization clock and the synchronization time difference value in each of the mobile terminals, wherein the synchronization time difference is received from a service guide server of the IP-based mobile TV server set; and
rendering the received streaming service according to the recovered NTP reference clock and the received NTP time stamps in each of the mobile terminals.

16. The method for synchronizing the rendering of a streaming service in a mobile TV system according to claim 15, further comprising receiving an available time difference value from the service guide server of the IP-based mobile TV server set to serve it as the synchronization time difference value in each of the mobile terminals.

17. The method for synchronizing the rendering of a streaming service in a mobile TV system according to claim 15, further comprising:
calculating an expected time difference value in each of the mobile terminals; and
determining the synchronization time difference value according to the expected time difference values, wherein the synchronization time difference value is not less than all the expected time difference values.

18. The method for synchronizing the rendering of a streaming service in a mobile TV system according to claim 17, wherein the step of calculating the expected time difference value in each of the mobile terminals comprises:
receiving a proposed time difference value from the service guide server of the IP-based mobile TV server set, and calculating the expected time difference value according to the proposed time difference value.

19. The method for synchronizing the rendering of a streaming service in a mobile TV system according to claim 17, wherein the step of determining the synchronization time difference value according to the expected time difference values comprises:
determining the synchronization time difference value through a distributed algorithm according to the expected time difference values.

20. The method for synchronizing the rendering of a streaming service in a mobile TV system according to claim 17, wherein the step of determining the synchronization time difference value according to the expected time difference values comprises:
transmitting the expected time difference values calculated in the mobile terminals to the IP-based mobile TV server set through the network equipment;
determining a common time difference value according to the expected time difference values by using the IP-based mobile TV server set and transmitting the common time difference value to the mobile terminals through the network equipment; and
taking the common time difference value as the synchronization time difference value in each of the mobile terminals.

21. The method for synchronizing the rendering of a streaming service in a mobile TV system according to claim 15, further comprising:
receiving a proposed time difference value from the service guide server;
inputting an expected fine-tuning value in each of the mobile terminals;
coordinating a common fine-tuning value according to the expected fine-tuning values through the mobile terminals; and
determining the synchronization time difference value through the proposed time difference value and the common fine-tuning value,
wherein the common fine-tuning value is not less than all the expected fine-tuning values.

22. The method for synchronizing the rendering of a streaming service in a mobile TV system according to claim 15, further comprising:
receiving a proposed time difference value from the service guide server;
inputting a uniform expected fine-tuning value in each of the mobile terminals; and
determining the synchronization time difference value through the proposed time difference value and the uniform expected fine-tuning value.

23. The method for synchronizing the rendering of a streaming service in a mobile TV system according to claim 15, further comprising:
defining the recovered NTP reference clock as the value of the synchronization clock; and converting each of the received NTP time stamps into a new NTP time stamp value by adding the original value of the received NTP time stamp and the synchronization time difference value.

24. The method for synchronizing the rendering of a streaming service in a mobile TV system according to claim 15, further comprising:
defining the recovered NTP reference clock through the following expression:

$$C_{NTP-R} = C_{sync} - dT_{sync}$$

wherein $C_{NTP-R}$ represents the recovered NTP reference clock, $C_{sync}$ represents the synchronization clock and $dT_{sync}$ represents the synchronization time difference value.

25. A mobile TV system comprising an Internet Protocol (IP)-based mobile TV server set, at least one network equipment and a plurality of mobile terminals, the plurality of mobile terminals configured to perform at least the following:
receiving a streaming service, a sequence of NTP time stamps corresponding to the streaming service, and a synchronization clock from the network equipment, wherein the streaming service and the sequence of NTP time stamps are received from the network equipment via the Real-time Transport Protocol (RTP), wherein related information of the transmitted streaming service is received by each of the mobile terminals before receiving the streaming service, the related information comprises a synchronization time difference value specific to the streaming service, and the synchronization time difference value is within session description protocol description;
recovering an NTP reference clock for rendering the received streaming service according to the synchronization clock and the synchronization time difference value, wherein the synchronization time difference is received from a service guide server of the IP-based mobile TV server set; and
rendering the received streaming service according to the recovered NTP reference clock and the received NTP time stamps.

26. The mobile TV system according to claim 25, wherein the recovered NTP reference clock is defined as the value of the synchronization clock, and each of the received NTP time stamps is converted into a new NTP time stamp value by adding the original value of the received NTP time stamp and the synchronization time difference value.

27. The mobile TV system according to claim 25, wherein the recovered NTP reference clock is defined through the following expression:

$$C_{NTP-R} = C_{sync} - dT_{sync}$$

wherein $C_{NTP-R}$ represents the recovered NTP reference clock, $C_{sync}$ represents the synchronization clock and $dT_{sync}$ represents the synchronization time difference value.

* * * * *